(12) United States Patent
Kral et al.

(10) Patent No.: US 7,520,415 B2
(45) Date of Patent: Apr. 21, 2009

(54) METHOD OF REPAIRING A RAIL

(75) Inventors: Richard F. Kral, N. Riverside, IL (US); Shane A. Mayhill, Crete, IL (US); Matthew Q. Johnson, Santa Fe, NM (US); Mark E. Rovnyak, Mokena, IL (US); Daniel J Coomer, Park Forest, IL (US)

(73) Assignee: Holland LP

( * ) Notice: Subject to any disclaimer, the term of this patent is extended or adjusted under 35 U.S.C. 154(b) by 180 days.

(21) Appl. No.: 10/569,711

(22) PCT Filed: Apr. 22, 2005

(86) PCT No.: PCT/US2005/014036

§ 371 (c)(1),
(2), (4) Date: Feb. 24, 2006

(87) PCT Pub. No.: WO2005/102581

PCT Pub. Date: Nov. 3, 2005

(65) Prior Publication Data

US 2007/0007251 A1 Jan. 11, 2007

Related U.S. Application Data

(60) Provisional application No. 60/564,763, filed on Apr. 23, 2004.

(51) Int. Cl.
*B23K 9/12* (2006.01)
(52) U.S. Cl. ............ 228/119; 219/54; 219/146.22
(58) Field of Classification Search ............ 228/119; 219/54, 137 WM, 146.1
See application file for complete search history.

(56) References Cited

U.S. PATENT DOCUMENTS

| | | | | |
|---|---|---|---|---|
| 4,068,111 A | * | 1/1978 | Klumpes | 219/73.11 |
| 4,229,643 A | * | 10/1980 | Caldwell | 219/146.24 |
| 4,803,340 A | * | 2/1989 | Sato et al. | 219/146.1 |
| 4,875,657 A | * | 10/1989 | Moller et al. | 249/86 |
| 5,704,570 A | * | 1/1998 | Irie et al. | 246/454 |
| 5,773,779 A | * | 6/1998 | Morlock | 219/54 |
| 6,396,020 B1 | * | 5/2002 | Thelen et al. | 219/54 |
| 6,515,249 B1 | * | 2/2003 | Valley et al. | 219/55 |
| 2002/0125216 A1 | * | 9/2002 | Sauron et al. | 219/54 |

* cited by examiner

*Primary Examiner*—Kiley Stoner
*Assistant Examiner*—Nicholas P D'Aniello
(74) *Attorney, Agent, or Firm*—Barnes & Thornburg LLP; David C. Brezina

(57) ABSTRACT

A system or method of repairing railroad rails which includes a head, upright and base sections. The method includes at least the following steps: identifying and locating a defect in the rail, removing the defect by removing material from the rail surrounding the defect in at least the head section so as to form a void and a rail void interface while maintaining continuity of the rail, filling the void with molten metal having a high carbon content and causing the molten metal and the rail void interface to bond. The molten metal may be produced by gas shielded arc welding. The carbon content of the molten metal is near that of the rail to decrease carbon migration from the rails. High carbon welding electrode is used in the welding of high strength steel using gas shielded arc welding techniques whereby a plurality of beads of molten weld material join together rail ends or fill a slot in a rail for repair purposes, the high carbon electrode avoiding adjacent soft and brittle areas across a weld fusion line which result from migration of carbon from the carbon rich high strength steel to the lower carbon weld deposit.

17 Claims, 2 Drawing Sheets

METHOD OF REPAIRING A RAIL

CLAIM OF PRIORITY

This application claims priority from Provisional Patent application Ser. No. 60/564,763 filed Apr. 23, 2004 and PCT Patent application Ser. No. PCT/US03/24741 filed Aug. 8, 2003 which claims priority from Provisional Patent application Ser. No. 60/402,184, filed Aug. 9, 2002.

BACKGROUND

1. Field

The invention relates to a method of repairing a railroad rail having a defect in the top portion of the rail by creating a cutout and filling the cutout with an appropriate material, preferably a high carbon content weld material.

2. Description of Related Art

Railroads have to maintain their track to ensure safe operation of trains. Some of this maintenance is centered around the repair of rail defects. Railroad rails may be manufactured with internal defects or, as a result of wear-and-tear or fatigue, develop defects. These defects are found using non-destructive test methods. The Federal Railway Administration (FRA) mandates periodic ultrasonic testing of railroad rails to locate defects in the rail. When a defect is found, a temporary accommodation or a repair must be made to the track structure. Many of these defects are located in the top portion (i.e. the web or head) of the rail.

There are two common welding processes used to facilitate the repair of defects in railroad rails. They are the thermite welding process and the flash-butt welding process. Rails repaired using a flash-butt weld are typically stronger and higher in quality than those repaired using a thermite weld. Repairs made using the thermite process are initially less costly due to the labor and additional equipment cost components required using the flash-butt process. Additionally, rail defects may be temporarily repaired through the use of Joint Bar splices (mechanical joints). The rail integrity is best maintained by having the lowest number of joints (mechanical or welded) in the track.

When repairing a rail defect, a length of rail localized around the defect is removed from the existing rail. This creates a gap (typically 13 to 19 feet in length) in the rail. A rail plug is inserted in the resulting gap to make up for the bulk of the rail length removed. A weld is then made at each end of the rail plug, welding the rail plug to the existing rail, and creating a continuously welded rail.

Regardless of the welding process used to install the rail plug, there is a need to maintain the Adjusted Rail Temperature (ART). The ART is the temperature at which the rail contains no longitudinal thermally induced rail stresses. The track is not designed to allow the rails to contract and expand in response to environmental temperature changes. It is designed to constrain the rail and to allow the rail to have tension and compression. The amount of tension or compression is determined by the ART and the Current Rail Temperature (CRT). The ART must be controlled because too low of an ART can cause the rail to buckle when the CRT of the rail is too high and too high of an ART can cause the rail to pull apart when the CRT of the rail is too low. Buckles and pull aparts cause unsafe conditions and can cause serious accidents.

When a repair is accomplished by installing a rail plug, it is unlikely that the rail plug installed will be of the exact length necessary to maintain the ART of the rail. The ART of the rail is altered. As such, the installed segment will have a different ART than desired. The ART of the entire rail adjacent to the repair plug installation is changed. Management of the ART could be simplified if the rail was not severed during the repair of a defect.

A thermite weld can be used to weld the existing rail to a rail plug. A rail plug is cut to a length approximately two inches shorter than the length of the rail, containing the defect, which is being cut out. The rail ends to be welded are aligned. A sand mold is attached to both the existing rail and the rail plug around an approximate one-inch gap between the end of the existing rail and the end of the rail plug. The thermite charge is contained in a crucible immediately above the sand mold. After the mold is pre-heated, the thermite charge is ignited. The thermite charge creates molten steel which pours into the sand mold. As the molten steel solidifies, it forms a casting which bonds to, and is contiguous with, both the existing rail and the rail plug. In this manner, the rail plug is welded to the existing rail to form a continuous section.

The rail ends at the other end of the rail plug are aligned. A second thermite weld is made at an approximate one-inch gap at the opposite end of the rail plug, joining the rail plug to the existing rail. The area of the rail containing the thermite weld is not as strong as and is not of the same quality as a normal rail. Moreover, such welds are not clean as they can include numerous inclusions from the welding process. As such, the thermite welds typically require subsequent repairs in order to maintain the railroad rail in a safe condition. This method also requires the repair crew to transport a rail plug to the repair site and the section of the rail containing the defect away from the site.

A flash-butt weld can be used to weld the existing rail to the rail plug. A rail plug is cut to a length approximately three inches longer than the length of the rail, containing the defect, which is being cut out. Rail anchors are removed from the existing rail until the gap created by the removal of the defect containing the plug is three inches longer than the defect containing the rail plug. This can only occur when the CRT is below the ART. When the CRT is below the ART, the rail is in a longitudinally tensile condition. The rail plug is put in to place in the track. The rail ends to be welded are aligned. A flash-butt welderhead is clamped across the abutment of the rail plug and the existing rail. The flash-butt welding cycle is carried out. The welderhead passes a high current across the interface between the existing rail and the rail plug. The current produces arcing between the mating surfaces. The arcing produces heat in both rails as well as a "flashing" away of the surfaces. As the cycle progresses and sufficient heat has been generated, the welderhead forges the two pieces of rail together to form an essentially single rail. The flashing away of the rail and the forging of the rail consume about one and one half inches of the rail from the rail plug. In this manner, the rail plug is welded to the existing rail to form a continuous section. A shear die is then pushed across the weld to remove the upset material and to return the profile to the rail contour.

The rail ends at the other end of the rail plug are aligned. The flash-butt welderhead is moved to the other end of the rail plug and clamped across the abutment of the rail plug and existing rail. The rail consumed during the production of the first flash-butt weld of the rail plug has created a gap at the location for the second weld. The rails are stretched to close the gap and the flash-butt weld cycle is carried out. The flash-butt weld consumes about one and one half inches of the rail at the second weld location. The rail is now returned to the pre-existing tensile condition. Rail anchors are placed onto the existing rail. The flash-butt welding process is typically more costly than a thermite process but produces a cleaner and stronger weld. However, this method also requires the repair crew to transport a plug to the rail repair site and the section of the rail containing the defect away from the site.

When rail plugs are installed using either the thermite or the flash-butt welding process, the rail is taken out of service. This prevents the railroad from running revenue producing trains. Thermite and flash-butt welding trucks need to occupy the track. The installation of a rail plug and resulting two welds uses valuable track time and needs to be kept at a minimum.

Joint Bar splices are, essentially, a reinforcing clamp applied to the rail to effect a temporary repair. A Joint Bar splice is used when there is not enough time to perform a complete repair or when other repair materials are not available. A Joint Bar splice, by government regulation, is a temporary repair and must be replaced within about 90 days. The Joint Bar splice reduces the operational limit of the rail in the repair area.

In the area of gas shielded arc welding of railroad rails, several approaches have been taught, although they have not necessarily met with functional success in the field. These include U.S. Pat. Nos. 6,407,364, 6,278,074, 6,207,920 and 6,201,216, all entitled "Method and system for welding railroad rails" and U.S. Pat. No. 5,605,283 entitled "Weld joint between two rails arranged behind each other along a rail track." Fixtures for rail welding are taught in U.S. Pat. No. 6,396,020 entitled "Rail welding apparatus incorporating rail restraining device, weld containment device and weld delivery unit." A key portion of computer robotic control for rail welding is taught in publication WO 0195132 entitled "Gap Welding Process." U.S. Pat. Nos. 5,605,283, 6,396,020 and WO 0195132 are all assigned to the same company as this application. All of the above patents, U.S. Pat. Nos. 6,407, 364, 6,278,074, 6,207,920, 6,201,216, 5,605,283, 6,396,020 and WP 0195132 are incorporated by reference as if fully set forth herein.

In addition to the above, it has been found that the amount of heat introduced into the rail during welding or gap closure can produce a de-carburizing effect at the rail interface. This can, in turn, result in the migration of carbon from the rail as well as a change in microstructure and material properties.

Moreover, the welding process can introduce hydrogen ($H_2$) into the final weld which has the effect of embrittling the weld material and causing a weld failure.

Steel used in high strength applications such as railroad track has a substantially uniform strength. When the ends of such material are welded through gas shielded arc welding such as that taught in U.S. Pat. Nos. 5,773,579, 5,877,868, 6,069,333, 6,166,347, 6,201,216, 6,207,920, 6,278,074 and 6,407,364. Using apparatus such as that taught in U.S. Pat. No. 6,396,020 and U.S. Application Publication No. 2002-170,884 or U.S. Pat. No. 5,605,283, strength variations across the weld fusion line are problematic.

Typical welding electrodes for joining material have a carbon content of 0.1% or less. While higher carbon content steel is known, forming that steel into welding electrode commercially is not accomplished.

Other prior art metal forming and treating techniques include drawing and annealing in a carburizing atmosphere although these procedures are not believed to have been used in combination in the production of welding electrode.

The metallurgical properties of welds generally have been discussed in a paper entitled "Effect of Carbon Content and Peritectic Reaction on Hot Cracking of Weld Metal of High Carbon Steel" authored by Koreaki Tamaki, Hiroshi Kawakami and Jippei Suzuki of the Department of Mechanical Engineering, Mie University, Kamihama-cho, Tsu, Mie, 514-8507, Japan. This paper provides general background.

Thus, it is desirable to provide a rail defect repair system that addresses above-identified issues and is acceptable to railroads for their use.

SUMMARY

The aforementioned issues can be addressed by solutions offered by the instant invention system. As more fully described below, the invention system or method is in the repair of a rail having a defect in the top portion of the rail. The invention includes the steps of removing the top portion of the rail containing the defect and replacing the removed portion of the existing rail, leaving the rest of the rail and its fastenings intact, with a high carbon content filler metal. Preferably, a weld material and a process which uses molds to contain the weld material is employed.

In order to address the problem in the prior art of a fusion line of high hardness in the weld immediately adjacent a zone of low hardness in the rail, when graphed showing a dramatic valley and then peak before hardness levels, welding is accomplished in the invention with the use of a higher carbon welding electrode. While the problem in the prior art of alloyed steel of the migration of the carbon from the rail to the weld results in high hardness to the point of brittleness in one zone and low hardness to the point of softness in an adjacent zone, the use of a welding electrode which produces a weld deposit having carbon content of about 0.2% to 1.0% provides adequate resistance to carbon migration to avoid loss to the point of the achievement of desirable strength and hardness properties.

In a first embodiment, a series of steps of drawing and annealing in a carbon rich atmosphere enables the production of welding electrode having a final carbon content which produces a weld deposit of about 0.2% to 1.0%.

In an alternative embodiment, a composite welding electrode is formed using steel as one component and having granulated or powdered carbon deposited therein. In general configuration, this alternative has the steel formed in a generally tubular shape with the carbon present in the interior chamber defined by the walls of the tube. In terms of metal forming technique, generally a steel bar is grooved, the carbon deposited and the steel then drawn or otherwise formed around the deposited carbon.

As more fully detailed hereinafter, a weld system employed provides a clean weld, a weld as strong as the parent rail, has a small heat affected zone (HAZ), provides a good bond with the rail, does not exhibit hydrogen ($H_2$) embrittlement, deals with the issues of ART and CRT, and avoids transporting long sections of rail.

The system provides a rail repair which results in a rail having strength and quality comparable to the parent rail, but without consuming rail or causing carbon migration.

The system provides a rail repair which reduces the total number of welds in the remaining rail.

The system provides a rail repair which reduces the amount of materials and equipment that must be transported to and from the repair site.

The system provides a rail repair which does not require the repair weld to be aligned in order to complete the repair.

The system provides a rail repair which can be completed in less time than prior art repair methods.

The system eliminates the use of temporary Joint Bar splices.

The system enables the railroad to simplify the management of the ART.

The system provides a rail repair which does not necessitate the occupation of the track by a vehicle.

The system provides a rail repair which does not necessitate the removal of a section of rail.

The system provides a rail repair which minimizes the amount of time that the rail is out of service to revenue producing trains.

The system provides a rail repair which minimizes the labor necessary to repair the defect while maintaining the ART.

Other features and advantages of the disclosure will be set forth in part in the description which follows and the accompanying drawings, wherein the embodiments of the disclosure are described and shown, and in part will become apparent upon examination of the following detailed description taken in conjunction with the accompanying drawings.

DETAILED DESCRIPTION

Figure 1:
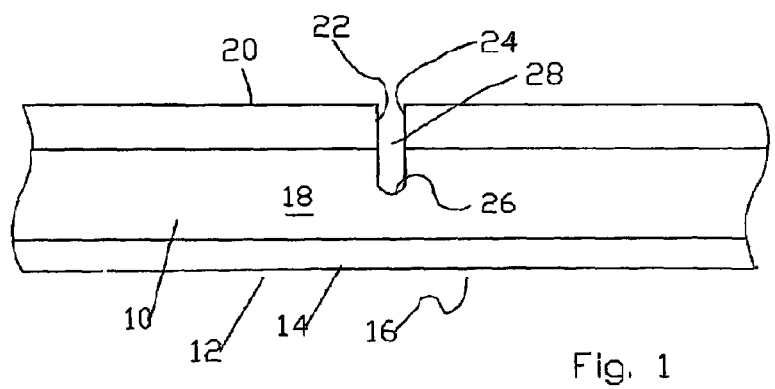
FIG. 1 is a side elevational view of a railroad rail with a defective portion removed.
Figure 2:
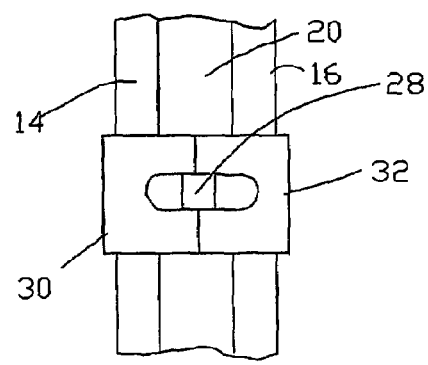
FIG. 2 is a top plan view of a railroad rail with a welding mold fixture in place.
Figure 3:
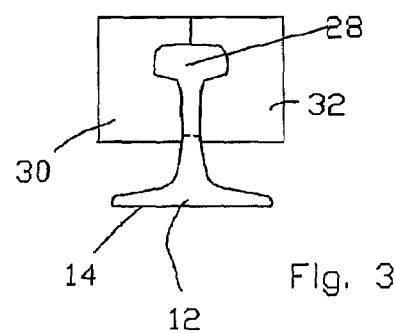
FIG. 3 is a sectional view of a railroad rail with a welding mold fixture in place.
Figure 4:
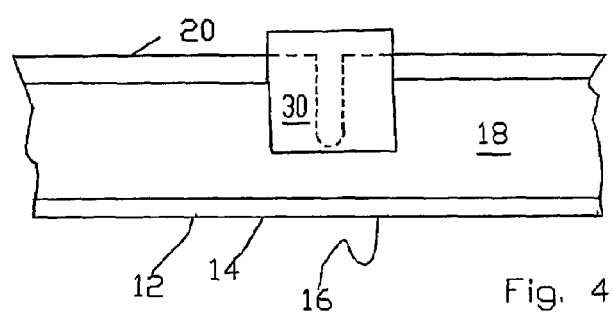
FIG. 4 is a side elevational view of a railroad rail with a welding mold fixture in place.

While the present disclosure will be described fully hereinafter with reference to the accompanying drawings, in which a particular embodiment is shown, it is to be understood at the outset that persons skilled in the art may modify the disclosure herein described while still achieving the desired result. Accordingly, the description that follows is to be understood as a broad informative disclosure directed to persons skilled in the appropriate art and not as limitations on the present disclosure.

A railroad rail 10 is typically formed having a base 12 with opposed flanges 14, 16, an upstanding web 18 extending upward from the base 12 between the flanges 14, 16 and a head 20 at the top of the web. The repair system or method begins when a rail defect is identified and located, such as by using an ultrasonic rail-testing car. The ultrasonic rail-testing car can precisely locate and mark the area of the rail containing the defect. Additionally, manual testing of the defect may further delineate the areas of the rail which contain the defect. The ultrasonic testing can confirm that the defect is totally contained in the top portion of the rail 10. The top portion of the rail 10 is then removed, as more fully described below. This top portion includes a selected portion of the rail head, the entire rail head, a selected portion of the rail web, the entire rail web, a selected portion of the base and the resulting section is filled using a filler metal, preferably weld metal. However, the rail is not completely severed and is still connected and continuous as only the section or portion of the rail has been removed.

To accomplish the repair, the top portion of the rail 10 containing the defect is accurately identified. A cutting, grinding or machining apparatus is clamped to the rail. Using the apparatus, the top portion of the rail containing the defect is removed. Preferably a specialized apparatus, having clamping and rail removing functions, including functioning as a jig to locate specific apparatus, is used. However, the operation could also be performed by very accurate operation of drilling and cutting tools. The removal is preferably accomplished by machining a slot in the head or the head and the web of the rail, or by hole coring and cutting of the rail, by grinding the rail or by machining the rail, but other methods may be used. Hole coring or drilling in the web initially leaves a round aperture, with the cutting of side walls 22, 24 through the hole, leaving a semicircular bottom. Machining, grinding or other methods leave a void or a slot with various geometry at the root. Some geometries are preferential to certain filler weld processes. The preferred geometries are a beveled bottom or a double J (i.e., opposed J shapes) shaped bottom.

Because only the top portion of the rail 10 is removed, that portion corresponding to the material of the slot 28 there is no change in the length of the rail and the ART remains unaffected. Because of the clamping action of the apparatus and the fact that only the top portion of the rail is removed, there is no need to accurately align the rail heads. The rail head is held in perfect alignment by the lower portion of the rail which has not been removed for replacement.

Containment shoes or molds 30, 32 are put in place around the void or slot 28 created by removal of the top portion of the rail. The bottom and remaining sides of the rail encompassing the void or slot 28 are preheated. The high carbon content filler metal welding element of the rail apparatus is then used to perform a filler metal weld, which fills the void created by the removal of the top portion of the rail. The containment shoes keep the molten metal from running out of the void and act to control the temperature of the filler metal weld.

Because the repair is accomplished without using a rail plug, there is no need to transport rail plugs to or away from the repair site. Additionally, the ART of the original rail is maintained as no additional rail or weld materials are or even can be added or removed from the existing rail. Because only a single weld needs to be made, no rail in the form of rail plugs needs to be removed and subsequently replaced and no anchors need to be removed and subsequently replaced, whereas prior methods required two welds, the repair method is faster than any prior repair methods. Given that the repair method is faster and does not require additional rail, this method of repair can be performed instead of using a Joint Bar splice. Because of the speed of the repair, the repair can be accomplished in the same track occupation as required by the detector car, thereby eliminating the need for a second track occupation and allowing more time for the running of revenue producing trains.

Certain filler metal welding processes use extremely clean filler metal to fill the void created by the removal of the top portion of the rail. Welding rods used in gas shielded arc welding, in the repair disclosed herein, has a carbon and alloy content suited for the needs of welding rail. The material characteristics and processes used to deposit the fill material can provide a structure which has the, properties equaling and far surpassing those of thermite weld.

More specifically, Gas Metal Arc Welding (GMAW) is preferred. This process employs a gas shielded welding process to protect the weld pool. Thus assuring a weld that is clean and substantially free of inclusions. The GMAW system provides the ability to limit heat build-up at the weld site. This reduces the annealing effect, the heat effected zone and the potential for carbon migration and microstructure or property changes. A high carbon content welding electrode can also be used to reduce carbon migration and increase the strength of the weld area as discussed in more detail below.

Moreover, in GMAW, the weld electrode can be carefully directed against the rail interface so as to assure a good bonding between the weld and the rail.

With GMAW, the weld electrode selected can be of the solid electrode type. The electrode produces a weld deposit having a carbon content between 0.1% and 1.0% by weight. By comparison, rail steel has a carbon content of about 0.84%. Appropriate alloying elements are also used in the weld rod or electrode. In general the weld electrode with the above carbon content and selected alloying can produce a weld with adequate bulk hardness and essentially stop migration of carbon from the rail.

Hydrogen embrittlement can cause steel to lose ductibility and impact values and in general degrades mechanical properties. Hydrogen embrittlement is to be avoided. Using GMAW with inert gas shielding protects the weld pool from atmospheric hydrogen. The solid electrode can be treated for removal of hydrogen.

The GMAW using inert gas shielding, a solid weld rod with the composition in the correct range and which has been treated for hydrogen removal is desirable.

In terms of welding, the shape of the bottom of the groove or weld root can be important, particularly on the first welding pass. The root is formed at the bottom of the groove and between the sides of the groove. The root can be beveled or double J-shaped.

The method taught here could be accomplished using the teachings, and in the alternative embodiment, void 28 could be filled by applying a thermite crucible and thermite method using shoes 30, 32 to contain the molten steel using thermite techniques. Other methods can be used to fill the removed section. These methods may be acceptable to a particular railroad depending upon their requirements. For example, a welding process known as the electroslag process (U.S. Pat. No. 4,429,207) where the weld pool is protected by a slag can be used. Another process that can be used is known as hidden arc welding (U.S. Pat. No. 5,695,665) where the position of the arc is self organizing. Also, a simple casting process where molten metal from a heated furnace can be deposited in the void where the defect has been removed. Each of the U.S. Pat. Nos. 4,429,207 and 5,695,665 are incorporated by reference as fully set forth herein.

Additional considerations in the rail repair are the controls of stresses in the repaired rail. The repair site can be crowned, by jacking base 12 under slot or void 28. When the weld is cooled and the jack released, relative compression will be applied on the finished weld filling the top portion of the repair site. Compression of the weld will help minimize the effect of such defects as might be present at the weld site. Similarly, changes in real temperature will effect any relative stresses between the filled top portion and the lower portion of the web 18 and base equally, as environmental factors, such as weather and sun, may cool or heat the entire rail. Using a filler material of hardness and strength substantially equivalent or greater to that of the original rail will make a finished rail having superior mechanical and stress properties when compared to prior art plug replacement, and be both directly economical in terms of time and materials to repair, and indirectly economically superior in terms of rail service continuity.

The location of the defect can be accurately determined through ultrasonic testing. A weld machining unit (WMU) can be clamped to the rail and the machining head is aligned with the defect. The WMU machines a slot or void in the rail to remove the defect and the immediately surrounding rail. The slot must be deep enough to eliminate the defect. The WMU can then be removed from the rail. A Weld Containment Device (WCD) as shown in Patent U.S. Pat. No. 6,396,020 is centered around the slot, attached to the rail and clamped in to place. A Weld Delivery Unit containing the welding torch and manipulator can be clamped to the rail. The WDU is also shown in U.S. Pat. No. 6,396,020. The WDU is aligned with the slot or void. The slot or void can then be preheated to the proper weld interpass temperature with an induction heating torch or an oxy-propane torch. The preheating torch is removed and the weld program is initiated.

Initially the weld is purged with shielding gas which is desirably a mixture of 85% argon and 15% carbon dioxide. A solid weld electrode having the following composition was used: 0.1% to 1.0% carbon, 1.8-2.0% manganese, 0.30-0.40% molybdenum, 0.5%-0.6% nickel, 0.5% to 0.95% silicon and the balance being iron and trace elements. The welding arc is initiated and the weld progresses with several uninterrupted passes. The number of passes will vary depending on the depth of the machining. About 4-18 passes can be used to fill a 0.875 inch deep groove which is one inch wide. The welding voltage is about 25-42V. The wire feed speed is about 150-250 inches per minute (ipm). The travel speed is ranges between 5 and 30 ipm. The resulting amperage is between 140 and 400 amps. A weave is used to improve penetration and tie-in. After the weld has been essentially completed, a post purge is used to shield the molten metal until it is solidified. The WDU is removed from the rail. The WCD is removed from the rail. The weld can then be finish ground to match the contour of the rail. U.S. Pat. No. 6,396,020 is incorporated by reference as if fully set forth herein.

There was no measurable change in the overall length of the plug being repaired indicating that there would be no change in the subsequent ART.

Use of high carbon welding electrode enables the welding of high carbon and high tensile steel pieces, such as railroad rails. When less than optimum welding electrode alloy is used, such as when using ordinary welding electrode used for joining ferrous material having a carbon content of 0.2% or less, carbon and alloying elements migrate across the fusion line between the material originating in the rail or work piece, and material contributed by the molten welding rod or electrode. There is therefore an area having significantly different material properties present. When a low carbon welding electrode has just solidified and is still at a high temperature, there is a tendency of the carbon molecules from the higher carbon steel rail to migrate from the rail to the weld material. This deprives the rail steel of high carbon, present for tensile strength, and adds unduly high carbon content to the welding electrode alloy at a temperature which, when cooled to ambient, results in a low strength and ductility in the rail and a high strength and brittleness in the immediately adjacent weld material. This fusion line of varying strengthened properties is exceedingly difficult to detect but results in a zone highly vulnerable to failure under high cyclic loads such as those imposed by running a train over rails.

Figure 5:
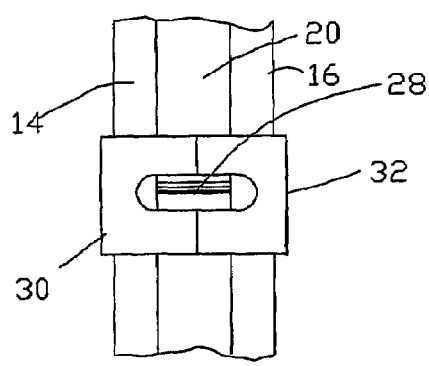
FIG. 5 is a top plan view of a railroad rail with a welding mold fixture in place.
Figure 6:
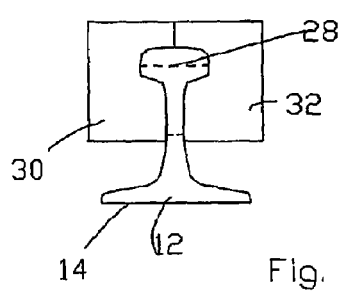
FIG. 6 is a sectional view of a railroad rail with a welding mold fixture in place.
Figure 7:
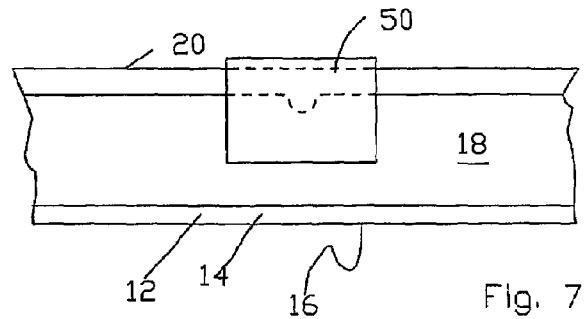
FIG. 7 is a side elevational view of a railroad rail with a welding mold fixture in place.
Figure 8:
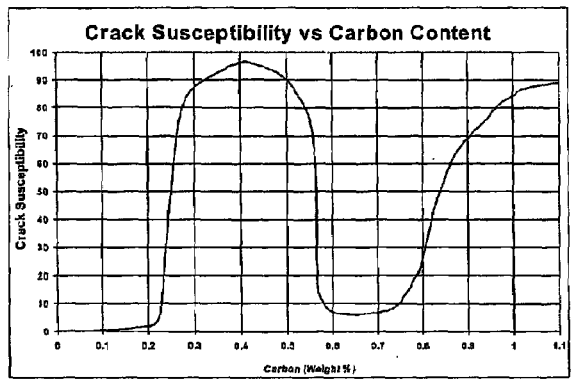
FIG. 8 is a graph showing hardness plotted against distance across a weld fusion line.

The graph in FIG. 5 generally shows this phenomenon as discussed in the Tamaki article. This is shown for illustration purposes, to show the crack susceptibility trends, not to provide quantification of specific materials. The experience with rail welds described herein is believed consistent.

Recent tests show that an optimum chemistry in a welding electrode which produces a deposit of 0.1% to 1.0% carbon, 1.8 to 2.0% manganese, 0.3 to 0.4% molybdenum, 0.5 to 0.6% nickel and 0.5 to 0.95% silicon, the balance of the alloy comprising iron, will resist the loss of carbon in the rail material and also have a weld material which will itself have adequate tensile strength.

The alloying materials should be present in the electrode itself, in higher proportions to account for loss in the welding operation as the plasma formed by welding causes disassociation of the materials. Thus in the electrode, the carbon should be a percentage as high as about 1.1% in a solid electrode to about 1.2% in a cored or composite electrode.

A difficulty in the use of this solid electrode is the difficulty in forming the rod in the first instance. Alloy, heat and forming processes all modify the material. Thus, the simple drawing of steel having a beginning alloy content in the proportions described above will result in a work hardening that prevents formation in the desired dimensions because of the brittleness imparted thereby. The annealing of the material will, in the ordinary instance, result in migration of a proportion of the carbon to the surface of the material, thereby resulting in a net loss of carbon from the surface as a result of the use of the material.

Figure 9:
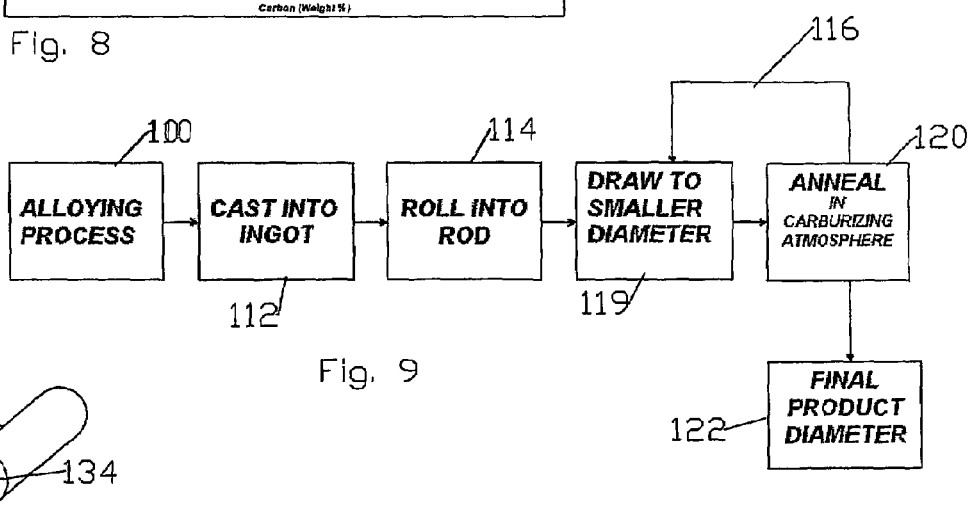
FIG. 9 is a flow chart showing the drawing, annealing and carburizing steps.

The forming of appropriate electrode of a desired dimension, such as 0.0625 inches is accomplished by a series of steps as shown in FIG. 9. An alloying process 110 is used to form an ingot 112 having a carbon content of about 0.20% or above. The ingot is formed 114 into rod of about 0.22 inches diameter and having a lower carbon content than the ingot from which it was produced, the loss being accounted for by the material process used. A series of steps 116 follow in which the rod is progressively drawn to form wire 118 of progressively smaller diameters, reducing by approximately 0.030 inches in each step, each reduction in diameter results in work hardening. The next step 120 combines annealing and carburizing. The drawn wire is annealed in a high carbon environment which therefore prevents carbon migration from the metal alloy. The combined annealing, carburizing step 120 is repeated until the drawing step 118 reduces the diameter to that desired as a finished diameter.

At the completion of the process it is expected that the finished electrode 122 will have a content in carbon which produces a weld deposit marginally below that of the electrode. The electrode is then ready for use in shielded arc welding. Use of such an electrode in a welding process such as described herein or other rail welding processes may be expected to result in relatively uniform strength across the fusion line between the work piece and weld material.

Figure 10:
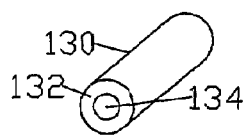
FIG. 10 is a schematic showing the composite weld electrode.

In an alternative embodiment, a composite welding electrode 130 is formed and arranged as shown in FIG. 10. The metallic portion 132 of the welding electrode is formed generally as a tube, with carbon and alloying element particles 134 in a powdered/granulated form filling the chamber defined by the walls of the tube. Relative dimensions are such that the particles 134 comprise a mixture of materials having the requisite composition to result in the finished electrode having the percentages described above, for example about 1.2% carbon, which when combined with the mild steel walls of the electrode during the welding operation will result in the desired concentration, within the ranges discussed above.

While the concepts of the present disclosure have been illustrated and described in detail in the drawings and foregoing description, such an illustration and description is to be considered as exemplary and not restrictive in character, it being understood that only the illustrative embodiments have been shown and described and that all changes and modifications that come within the spirit of the disclosure are desired and protected.

There are a plurality of advantages that may be inferred from the present disclosure arising from the various features of the apparatus, systems and methods described herein. It will be noted that alternative embodiments of each of the apparatus, systems, and methods of the present disclosure may not include all of the features described yet still benefit from at least some of the inferred advantages of such features. Those of ordinary skill in the art may readily devise their own implementations of an apparatus, system, and method that incorporate one or more of the features of the present disclosure and fall within the spirit and scope of the invention as defined by the appended claims.

What is claimed is:

1. A method of repairing a metal rail, which rail includes head, upright web and base sections, said method comprising the steps of:
   a) identifying and locating a defect in the metal rail;
   b) removing the defect from the metal rail by removing the defect and metal material surrounding the defect, so as to expose parent metal of said rail in opposed, substantially parallel walls and a floor extending therebetween, form a void and a rail-void interface at said walls and floor, while maintaining continuity of the base and at least a portion of the web of the metal rail;
   c) filling the void with molten metal; and
   d) causing the molten metal and the metal rail at the rail-void interface to bond by fusion of said molten metal to said parent metal when said molten metal and rail are at a sufficiently elevated temperature to enable fusion, wherein,
   the void is filled with molten metal by arc welding,
   the void is filled using gas shielded arc welding,
   a high carbon welding electrode is used to fill in the void,
   the carbon percentage in the welding electrode is from, by weight, about 0.1% to about 1.2% carbon and
   the high carbon welding electrode produces a weld deposit from, by weight, about 0.2% to about 1.0% carbon, from about 1.8% to about 2.0% manganese, from about 0.5% to about 0.6% nickel and from about 0.5% to about 0.95% silicon.

2. A method as in claim 1 wherein the method includes the step of solidifying the molten metal and solidified metal is substantially free of inclusions.

3. A method as in claim 1 wherein the method includes the step of solidifying the molten and solidified metal and rail each include carbon wherein the carbon content of the molten metal is approximately equal to the carbon content of the rail.

4. A method as in claim 1 wherein the quantity of heat introduced by the molten metal is minimized.

5. A method as in claim 1 wherein the void is formed by machining.

6. A method as in claim 1 wherein the void is formed by cutting.

7. A method as in claim 1 wherein the void is formed by grinding.

8. A method as in claim 1 wherein the void is slot-shaped and includes a lower portion shaped to form a weld root.

9. A method as in claim 8 wherein the weld root is bevel-shaped.

10. A method as in claim 8 wherein the weld root is J-shaped.

11. A method as in claim 1 wherein the annealing effect and heat affected zone of the rail-void interface is minimized.

12. A method as in claim 1 wherein the inert gas shielded arc welding employs a solid weld electrode.

13. A method as in claim 12 wherein the solid electrode has been treated so as to remove hydrogen and minimize hydrogen embrittlement.

14. The method of claim 1 further comprising the weld metal includes from about 0.55% to about 0.95% by weight carbon.

15. A method as in claim 1 wherein the void is filled with molten metal using a high temperature, fusion producing process comprising one of: (a) gas shielded metal arc welding, (b) the submerged arc process, (c) electroslag arc welding process, or (d) hidden arc welding process.

16. The method of claim 15 further comprising:

said process uses gas shielded metal arc welding;

said arc welding process is inert gas arc welding.

17. A method of repairing a rail, which rail includes head, upright web and base sections, said method comprising the steps of:

a) identifying and locating a defect in the rail;

b) removing the defect from the rail by mechanically removing the defect and material surrounding the defect, form a void and a rail-void interface, while maintaining continuity of the base and at least a portion of the web of the rail;

c) filling the void with molten metal; and d) causing the molten metal and the rail at the rail-void interface to bond;

wherein the void is filled with molten metal by one of arc welding, gas shielded arc welding or inert gas arc welding, which filling steps each cause said molten metal to fuse with the rail;

said molten metal is formed from a material resulting in a weld deposit having a carbon concentration of about 0.2% to 1.0% by weight, wherein the high carbon welding electrode produces a weld deposit from, by weight, about 0.2% to about 1.0% carbon, from about 1.8% to about 2.0% manganese, from about 0.5% to about 0.6% nickel and from about 0.5% to about 0.95% silicon.

* * * * *